United States Patent
Salustri et al.

(10) Patent No.: US 9,001,898 B2
(45) Date of Patent: Apr. 7, 2015

(54) METHOD AND SYSTEM FOR SERIAL DIGITAL INTERFACE (SDI) VIDEO DATA EXTENSION

(75) Inventors: Christopher Robert Salustri, Monroe, CT (US); Martin Green, Shelton, CT (US)

(73) Assignee: Thinklogical, LLC, Milford, CT (US)

( * ) Notice: Subject to any disclaimer, the term of this patent is extended or adjusted under 35 U.S.C. 154(b) by 931 days.

(21) Appl. No.: 13/134,568

(22) Filed: Jun. 10, 2011

(65) Prior Publication Data

US 2012/0314778 A1   Dec. 13, 2012

(51) Int. Cl.
| | |
|---|---|
| H04N 11/02 | (2006.01) |
| H04N 21/845 | (2011.01) |
| H04N 7/22 | (2006.01) |
| H04N 21/236 | (2011.01) |
| H04N 21/434 | (2011.01) |

(52) U.S. Cl.
CPC ............. *H04N 21/8456* (2013.01); *H04N 7/22* (2013.01); *H04N 21/23602* (2013.01); *H04N 21/4342* (2013.01); *H04N 21/23614* (2013.01); *H04N 21/4348* (2013.01); *H04N 21/8458* (2013.01)

(58) Field of Classification Search
CPC .................................................... H04N 21/235
USPC ........................ 375/240.02–240.29
See application file for complete search history.

(56) References Cited

U.S. PATENT DOCUMENTS

| | | |
|---|---|---|
| 5,749,084 A | 5/1998 | Huck et al. |
| 6,747,983 B1 * | 6/2004 | Knutson et al. ............... 370/412 |
| 7,835,437 B1 | 11/2010 | Zhang et al. |

OTHER PUBLICATIONS

International Preliminary Report on Patentability for International Application Serial No. PCT/US2012/38485; International Filing Date May 18, 2012; Date of Mailing Dec. 27, 2013.

* cited by examiner

*Primary Examiner* — Dave Czekaj
*Assistant Examiner* — Leron Beck
(74) *Attorney, Agent, or Firm* — Cantor Colburn LLP

(57) ABSTRACT

A video data extension system includes a transmitter and a receiver for transmitting and receiving encoded serial data. Transmitter is configured to receive one SDI 3G video stream at 2.97 Gb/s, two HD-SDI video streams at 1.485 Gb/s, two SD-SDI at 270 Mb/s, or one HD-SDI at 1.485 Gb/s and one SD-SDI at 270 Mb/s. Received data is segmented into packets to form an extended video stream for transmission at 3.75 Gb/s. To each packet, idle and header are provided. Data such as RS422 data may be included in the extended video stream. Where the received data includes data from two HD streams, received data are segmented into two groups of data packets for arranging into extended video stream in an alternate manner. Upon receiving the extended video stream, receiver uses idles to align data and header information to separate the HD streams.

19 Claims, 9 Drawing Sheets

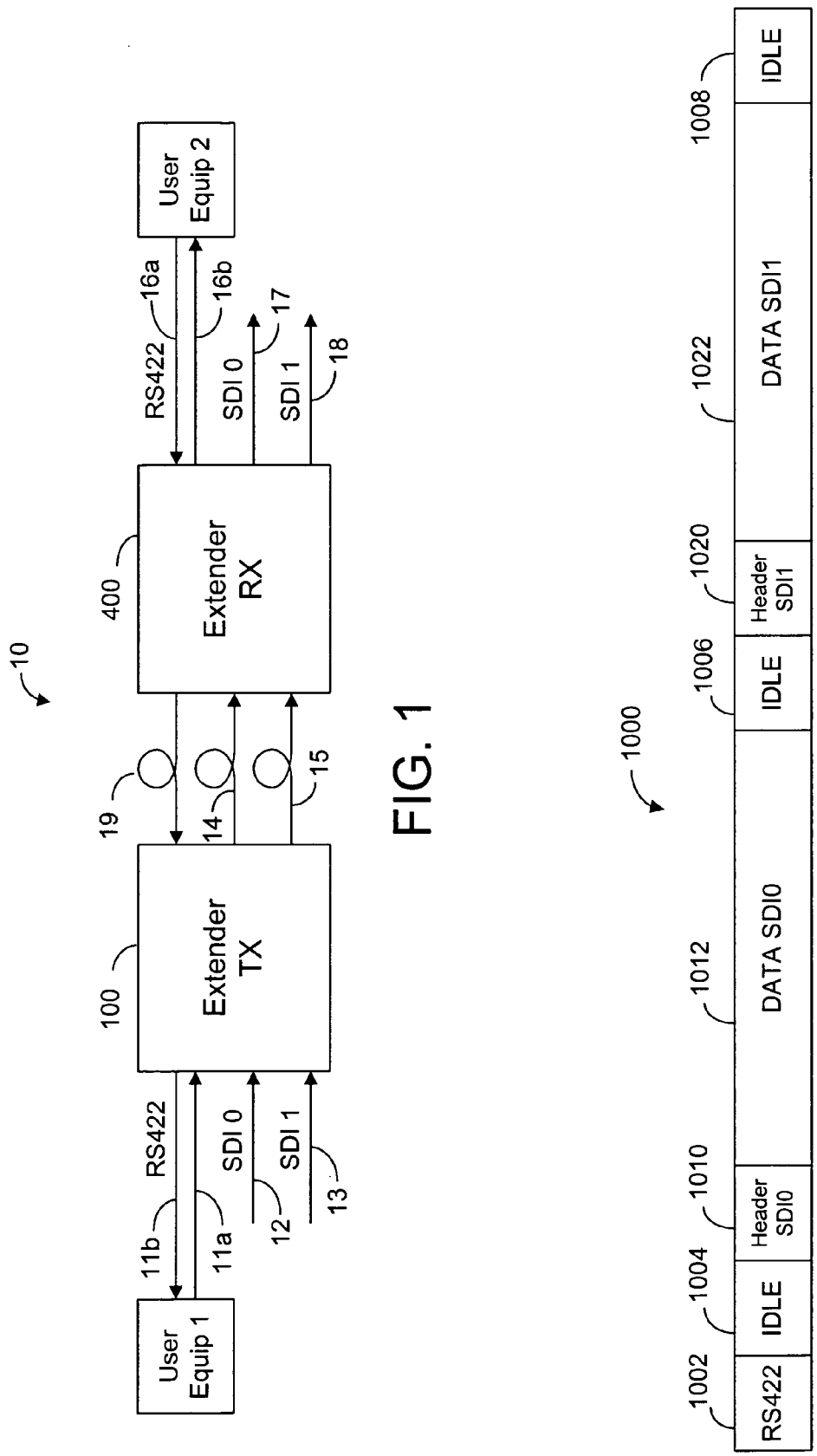

METHOD AND SYSTEM FOR SERIAL DIGITAL INTERFACE (SDI) VIDEO DATA EXTENSION

FIELD OF THE INVENTION

The present invention relates generally to video data transmission and, in particular, to transmission systems for transmitting video data over optical fibers. It also relates to reception of such video data.

BACKGROUND OF THE INVENTION

Serial digital interface (SDI) video data has been transmitted over copper wires from one location to a second, remote location for display on a remote monitor. SDI video data has also been transmitted over fiber optical cables, but there is a need for doing so without the use of special optical laser components as well as to be able handle all the data rates associated with SDI and to be able to add a full-duplex channel to the video data for camera control, for example. There has also been a need for allowing such video data to be transferred at a higher clock rate in a manner which is easy to facilitate.

The present invention is directed to such an improved transmission system and is especially directed to a video data extension system wherein additional information is also transferable along with the video data.

SUMMARY OF THE INVENTION

The present invention provides a method and apparatus for transmitting an extended video data bitstream over optical fibers. In particular, the extended video data bitstream is transmitted at 3.75 Gb/s. The present invention provides a video data extension system which includes a transmitter and a receiver for transmitting and receiving encoded serial data over optical fibers. The transmitter can be configured to receive one 3G-SDI video stream at 2.97 Gb/s, two HD-SDI video streams at 1.485 Gb/s, two SD-SDI video streams at 270 Mb/s, or one HD-SDI at 1.485 Gb/s and one SD-SDI at 270 Mb/s. Received data is segmented into packets to form an extended video stream for transmission at 3.75 Gb/s. To each packet, idle and header are provided. Out-of-band data, such as RS422 data, may be included in the extended video stream to allow the end user to use for equipment control. In cases where the received data includes data from two streams, such as HD-SDI streams, the received data are segmented into two groups of data packets for arranging into extended video stream in an alternate manner. Upon receiving the extended video stream, the receiver uses idles to align data and uses the header information to separate the streams.

Thus, the first aspect of the present invention is a method for video data extension. The method comprises:

receiving a video bitstream, the video bitstream comprising video data received at a first bit-rate;

segmenting the video bitstream into a plurality of segments, wherein the maximum number of bits in any segment of said plurality of segments is n with n a positive integer greater than one, and wherein at least some of said plurality of segments comprise n-bit data segments;

appending an additional segment to each of said plurality of segments for providing an extended video bitstream, wherein the additional segment comprises m-bit information, wherein m is a positive integer greater than one; and transmitting the extended video bitstream at a second bit-rate, wherein the second bit-rate is equal to or greater than (n+m)/n times the first bit-rate.

The method further comprises:

obtaining a first clock signal from the video bitstream, the first clock signal indicative of the first bit-rate;

generating a second clock signal based on the second bit-rate;

converting the serial data into parallel data;

buffering the parallel data before segmenting the video bitstream into the plurality of segments based on the first clock signal and the second clock signal; and converting the parallel data into serial data, encoding the serial data before transmitting the extended video bitstream.

According to one embodiment of the present invention, the m-bit information comprises header information and a word specified for data alignment purposes. The m-bit information may include video control information.

In one embodiment of the present invention, the video bitstream comprises a first video stream comprising first serial data and a second video stream comprising second serial data. The method further comprises:

obtaining a first clock signal from the first video stream and obtaining a second clock signal from the second video stream, the first clock signal and the second clock signal indicative of the first bit rate;

generating a third clock signal based on the second bit-rate, wherein each of the first clock signal and the second clock signal comprises a clock rate substantially equal to half of the first bit rate;

converting the first serial data into first parallel data and converting the second serial data into second parallel data, wherein said segmenting comprises:

dividing the first parallel data into a plurality of first data packets based on the first clock signal and the third clock signal, dividing the second parallel data into a plurality of second data packets based on the second clock signal and the third clock signal; and arranging the first data packets and second data packets in an alternate manner for forming said plurality of segments.

According to the present invention, the video bitstream may comprise an aligned, dual-link bitstream formed from the first video stream and the second video stream, and the first and second data packets may comprise timing reference information. When a receiver receives the extended video bitstream and retrieves the first data packets and the second data packets from the extended video bitstream, it uses the timing reference information for data alignment in reconstructing the dual-link bitstream from the first data packets and the second data packets. As such, the alignment of the video streams is preserved and recreated at the receiver output.

According to one embodiment of the present invention, said converting comprises:

a serial-to-parallel conversion for converting the first serial data to a 20-bit parallel data, and a parallel-to-parallel conversion for converting the 20-bit parallel data to a 32-bit parallel data in said first parallel data, and the method further comprises:

shifting the 20-bit parallel data for simultaneously providing the 20-bit parallel data in four delayed parallel data streams, and selecting the first parallel data from the delayed parallel data streams.

The second aspect of the present invention is an apparatus, which comprises:

an input end configured to receive a video bitstream, the video bitstream comprising video data received at a first bit-rate;

a segmenter configured to segment the video bitstream into a plurality of segments, wherein the maximum number of bits in any segment of said plurality of segments is n with n a positive integer greater than one, and wherein at least some of said plurality of segments comprise n-bit data segments;

a control module configured to append an additional segment to each of said plurality of segments for providing an extended video bitstream; wherein the additional segment comprises m-bit information, wherein m is a positive integer greater than one; and a transmitter module configured to transmit the extended video bitstream at a second bit-rate, wherein the second bit-rate is equal to or greater than (n+m)/n times the first bit-rate, wherein the m-bit information comprises header information and a word specified for data alignment purposes.

In one embodiment of the present invention, the video data comprises serial data, and said apparatus further comprises:

a processor configured to convert the serial data into parallel data, and to obtain a first clock signal from the video bitstream, the first clock signal indicative of the first bit-rate;

a signal generator configured to generate a second clock signal based on the second bit-rate; and a buffer for buffering the parallel data before the segmenter segments the video bitstream into said plurality of segments based on the first clock signal and the second clock signal.

In one embodiment of the present invention, the extended video bitstream comprises parallel data, and said apparatus further comprises:

a converter configured to convert the parallel data into serial data, wherein the transmitter portion is further configured to encode the serial data before transmitting the extended video bitstream.

In one embodiment of the present invention, the video bitstream comprises a first video stream comprising first serial data and a second data stream comprising second serial data, and said apparatus further comprises:

a first converter configured to convert the first serial data into first parallel data and to obtain a first clock signal from the first video stream, the first clock signal indicative of the first bit-rate;

a second converter configured to convert the second serial data into second parallel data and to obtain a second clock signal from the second video stream, the second clock signal indicative of the first bit-rate; and a signal generator configured to generate a third clock signal based on the second bit-rate, wherein the segmenter comprises:

a first buffer configured to release the first parallel data for forming a plurality of first data packets based on the first clock signal and the third clock signal, and a second buffer configured to release the second parallel data for forming a plurality of second data packets based on the second clock signal and the third signal, wherein the control module further configured to arrange the first data packets and the second data packets in an alternate manner for forming said plurality of segments.

The third aspect of the present invention is an apparatus, which comprises:

a receiving end configured to receive a video bitstream at a first bit-rate, wherein the video bitstream comprising a plurality of video data segments and wherein the maximum number of bits in any segment in said plurality of video data segments is n with n a positive integer greater than one and each of said plurality of video data segments is associated with an information segment comprising data alignment information, and wherein the information segment comprises m bits with m a positive integer greater than one;

a control module configured to extract the video data segments from the video bitstream based on the data alignment information for forming a reduced video bitstream from the extracted video data segments; and a transmitter configured to transmit the reduced video bitstream at a second bit-rate, wherein the second bit-rate is equal to or smaller than n/(n+m) times the first bit-rate.

In one embodiment of the present invention, the video bitstream comprises a plurality of first data packets and a plurality of second data packets arranged in an alternate manner for forming said plurality of video data segments, wherein the information segment comprises header information indicating whether each of the video data segments comprises a first data packet or a second data packet, and wherein the control module is further configured to separate the plurality of first data packets from said plurality of second data packets for forming the reduced video bitstream.

In one embodiment of the present invention, the video bitstream comprises encoded serial data, and said apparatus further comprises:

a receiver configured to decode and convert the encoded serial data into parallel data before the control module extracts the video data segments; and a processor configured to form a first data stream comprising said plurality of first data packets and a second data stream comprising said plurality of second data packets, and further configured to convert the parallel data in the first data stream and in the second data stream into serial data having a clock rate substantially equal to half the second bit rate for transmission.

The present invention will become apparent upon reading the description taken in conjunction with FIGS. 1 to 10c.

BRIEF DESCRIPTION OF THE DRAWINGS

FIG. 1 is a block diagram showing a general construction of a video extension system, according to the present invention.

FIG. 2 shows an example of the extended video bitstream transmitted over an optical fiber from the transmitter to the receiver.

DETAILED DESCRIPTIONS

Figure 3:
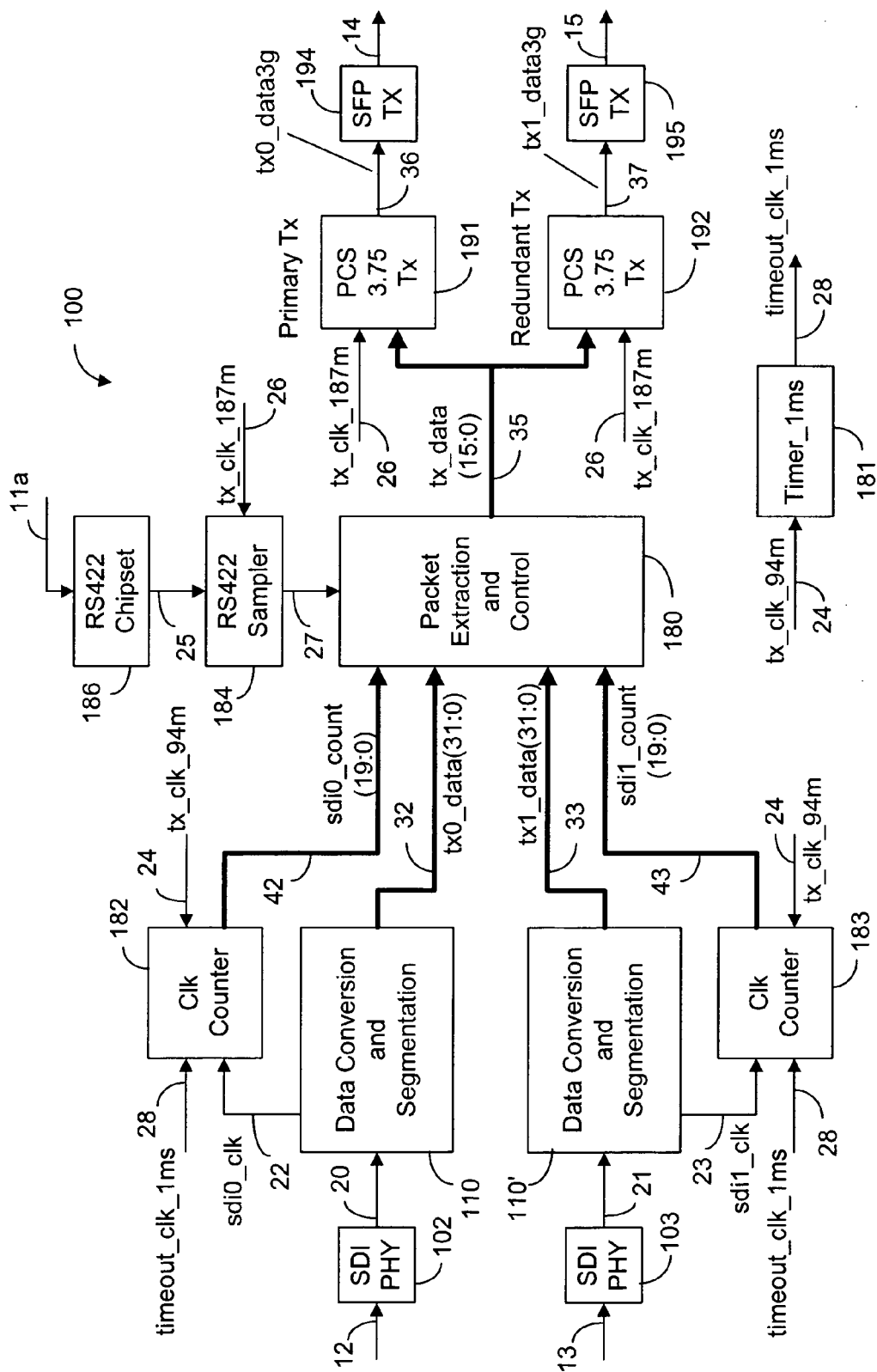
FIG. 3 is a block diagram of a transmitter, according to one embodiment of the present invention.

As seen in FIG. 1, a video data extension system 10 comprises a transmitter 100 and a receiver 400 linked together by one or more serial data links 14, 15, such as optical fibers. The transmitter 100 is configured to receive one, two or more incoming data streams and the receiver 400 is configured to output one, two or more data streams. For illustrative purposes only, the transmitter 100 receives two SDI (Serial Data Interface) video data streams via input data links 12 and 13, which are usually coaxial copper wires. The transmitter 100 may also receive out-of-band data, such as RS422 data, via a data link 19. RS422 data can be used to control the motion of a video camera, for example. The serial data stream transferred via the optical fiber links 14, 15 is referred to as an extended video bitstream. The receiver 400 receives the extended video bitstream from the transmitter 100 and outputs two SDI video data streams on two output data links 17, 18, which are usually coaxial cables. In addition, the receiver 400 outputs RS422 data on the data link 19. As shown in FIG. 1, the transmitter 100 is connected to a bidirectional RS422 link (11a, 11b) linking to a user equipment and the receiver 400 is also connected to a bidirectional RS422 link (16a, 16b) linking to another user equipment. In the case of remote camera control, the user equipment linking to the RS422 link (11a, 11b) on the transmitter side would be a camera, and the user equipment linking to the RS422 link (16a, 16b) on the receiver side would be a controller module. The receiver side could send camera control commands on link 16a over the back channel link 19 to the camera via link 11b. The camera could send feedback or status information back to controller module via links 11a and 16b. Transmitter 100 has a sampler circuit and a chipset (see FIG. 3) for receiving RS422 information on input link 11a and outputting the information over the optical fiber links 14, 15. Transmitter 100 also has a regenerator circuit and a chipset (see FIG. 10a) for receiving back-channel RS422 signal from data link 19 and outputting it on output link 11b. Receiver 400 has a regenerator circuit and a chipset (see FIG. 7) for receiving RS422 information from optical fiber link 14 and sending the information to the output link 16b. Receiver 400 also has a sampler circuit and a chipset (see FIG. 10b) for receiving RS422 information from input link 16a and sending the information over data link 19 back to transmitter 100.

In one embodiment of the present invention, the transmitter 100 is configured to receive two SDI video data streams transferred at an HD rate of 1.485 Gb/s and to transmit an extended video bitstream over one or two optical fibers at a typical rate of 3.75 Gb/s (3.7498125 Gb/s minimum). The extended video bitstream is transferred over optical fibers using industry standard 8b/10b encoding of data for transmission via industry standard SFP (small form-factor pluggable) fiber optical modules. The two received SDI video data streams can be independent and unrelated HD-SDI streams of SMPTE 292M standard, for example. The two SDI video streams can also be used to convey dual-link data of SMPTE 372M standard.

In another embodiment of the present invention, the transmitter 100 is configured to receive one SDI video data stream transferred at a 3G rate of 2.97 Gb/s.

In one embodiment of the present invention, the receiver 400 is configured to output two SDI video data streams at an HD rate of 1.485 Gb/s.

In another embodiment of the present invention, the receiver 400 is configured to output one or two SDI video data streams at a 3G rate of 2.97 Gb/s.

In yet another embodiment of the present invention, the transmitter 100 is configured to receive SDI data at a rate lower than the HD rate of 1.485 Gb/s, and the receiver 400 is configured to output SDI data at a rate lower than the HD rate. For example, the SDI data is transferred at an SD rate of 270 Mb/s. Accordingly, the transmitter 100 is configured to receive eleven SDI video data streams transferred at 270 Mb/s and the receiver 400 is configured to output eleven SDI video data streams at 270 Mb/s. It should be noted that the SMPTE 259M standard also supports an SD rate of 360 Mb/s, 143 Mb/s and 177 Mb/s. Thus, the number of input video data links on the transmitter is varied accordingly. Furthermore, the video streams received by the transmitter 100 can be data streams of different bit rates. For example, the transmitter 100 can be configured to receive one HD-SDI stream at 1.485 Gb/s and one SD-SDI stream at 270 Mb/s.

It should be understood that each of the data transfer rates according to various embodiments of the present invention also includes the fractional 1/1.001 rate.

Since the data rate of 3.75 Gb/s over the optical fibers is higher than the data rate of 2.97 Gb/s (one 3G stream or two HD streams) over the coaxial cables, the present invention provides "out-of-band data" (i.e., data not specific to SDI) in the extended video bitstream such that the out-of-band data may be used by the end user for equipment control. The out-of-band data included in the extended video bitstream can be RS422 data, for example.

In order to convey the out-of-band data from the transmitter to the receiver over optical fibers, the received video bitstream containing SDI video data is segmented by the transmitter into a plurality of segments. An additional segment is added to each of the segments so that the out-of-band data may be provided in the additional segment. The additional segment includes a header section and one or more idle sections. In the embodiment where the transmitter receives video data in two SDI video streams, SDI0 and SDI1, the two SDI video streams are separately segmented into SDI0 data packets and SDI1 data packets. These SDI0 and SDI1 data packets are arranged in an alternate manner to form the plurality of segments. As shown in FIG. 2, the extended video bitstream 1000 has a plurality of sections, including SDI0 data packets and SDI1 data packets arranged in an alternate manner. Each SDI0 data packet 1012 is associated with an SDI0 header section 1010 and each SDI1 data packet 1022 is associated with an SDI1 header section 1020. In this particular case, the header section can be used to indicate whether the data in the data packet is associated with SDI0 or SDI1. In general, the header section is used to indicate whether the video data is SD, HD or 3G data. The idle sections, such as idles 1004, 1006, 1008, may contain special words which can be identified in the receiver for data alignment purposes. Furthermore, the RS422 data 1002 may be included in the extended video bitstream 1000.

According to one embodiment of the present invention, the nominal transmission rate over optical fibers is 3.75 Gb/s and the SDI 3G rate over coaxial copper wires is 2.97 Gb/s. If each of the data packets in the extended video bitstream contains a maximum of n bits of SDI data (n an integer greater than one) and the out-of-band data, including the header, is embedded in an m-bit additional section (m an integer greater than one), then the ratio of (n+m)/n must be equal to or smaller than 3.75/2.97. In other words, if the SDI data in the received video bitstream is transferred at a first bit rate of 2.97 Gb/s and the extended video bitstream is transmitted over the optical fibers at a second bit rate of 3.75 Gb/s, then the ratio of the second bit rate to the first bit rate is equal to or greater than (n+m)/n. In other words, the second bit rate is equal to or greater than (n+m)/n times the first bit rate.

FIG. 3 is a block diagram of the transmitter 100 in the video extension system 10. Transmitter 100 has two connectors 102, 103 for receiving video data streams from input data links 12, 13 and providing video data SDI0, SDI1 to two data processors 110, 110' via data links 20, 21. Data processor 110 segments the video data SDI0 into a plurality of SDI0 data segments or packets and provides the segmented data 32 to a control module 180. Data processor 110 also obtains a clock signal 22 from the SDI0 data. Likewise, data processor 110' is configured to segment the video data SDI1 into a plurality of SDI1 data segments or packets and provides the segmented data 33 to the control module 180. Data processor 110' also obtains a clock signal 23 from the SDI1 data. Control module 180 arranges the SDI0 data packets and the SDI1 data packets in an alternate fashion in a data sequence 35, and adds a header section and an idle section to each data packet, as shown in FIG. 2. Based on the RS422 information as provided on data link 27, control module 180 may include RS422 data in the data sequence 35. The RS422 information may be obtained from an RS422 chipset 186 via data link 11a and an RS422 sampler 184 via data link 25. The transmitter 100 uses a reference clock, such as a clock oscillator (see FIG. 10c), to generate a 187.5 MHz clock signal 26 (tx_clk__187m) and a divider to provide a 93.75 MHz clock signal 24 (tx_clk__194m).

According to one embodiment of the present invention, the data sequence 35 is provided to a transmitter module 191 and a copy of the same data is provided to another transmitter module 192. In the transmitter modules 191 and 192, a 20× multiplier is used to generate the 3.75 Gb/s transmission clock signal from the 187.5 MHz clock signal 26. The transmitter modules 191, 192 also serialize and encode the data sequence 35 into 8b/10b encoded data 36, 37 to be transmitted at 3.75 Gb/s clock rate over optical fibers 14, 15 via fiber optical modules 194, 195.

Figure 6:
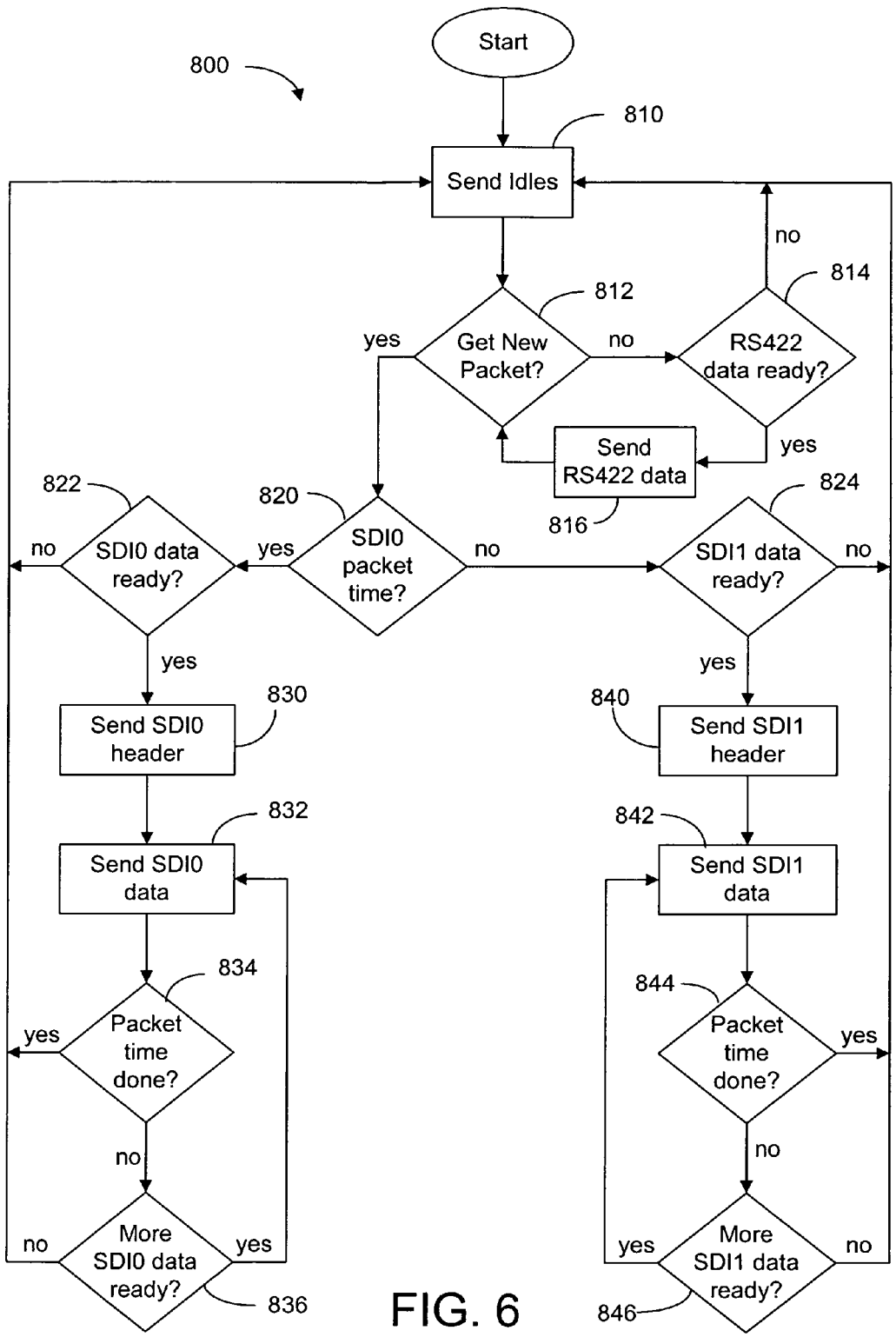
FIG. 6 is a flowchart showing an example of how data packets extracted from different data channel are inserted into an extended video bitstream.

Transmitter 100 uses a clock rate divider (see FIG. 10c) to generate a 93.75 MHz clock signal 24 (tx_clk__94m) from the 187.5 MHz clock signal 26, and uses a timer 181 to generate a timeout clock signal 28 (timeout_clk__1ms) based on the 93.75 MHz clock signal 24. Based on the clock signal 22, the clock signal 24 and the timeout clock signal 28, a clock counter 182 counts the frequency of the SDI0 data for providing information indicative of the frequency in the SDI0 header section 1010. Likewise, based on the clock signal 23, the clock signal 24 and the timeout clock signal 28, a clock counter 183 counts the frequency of the SDI1 data for providing information indicative of the frequency in the SDI1 header section 1020. A flowchart showing how control module 180 arranges the data packets in the extended video bitstream is shown in FIG. 6.

Figure 4:
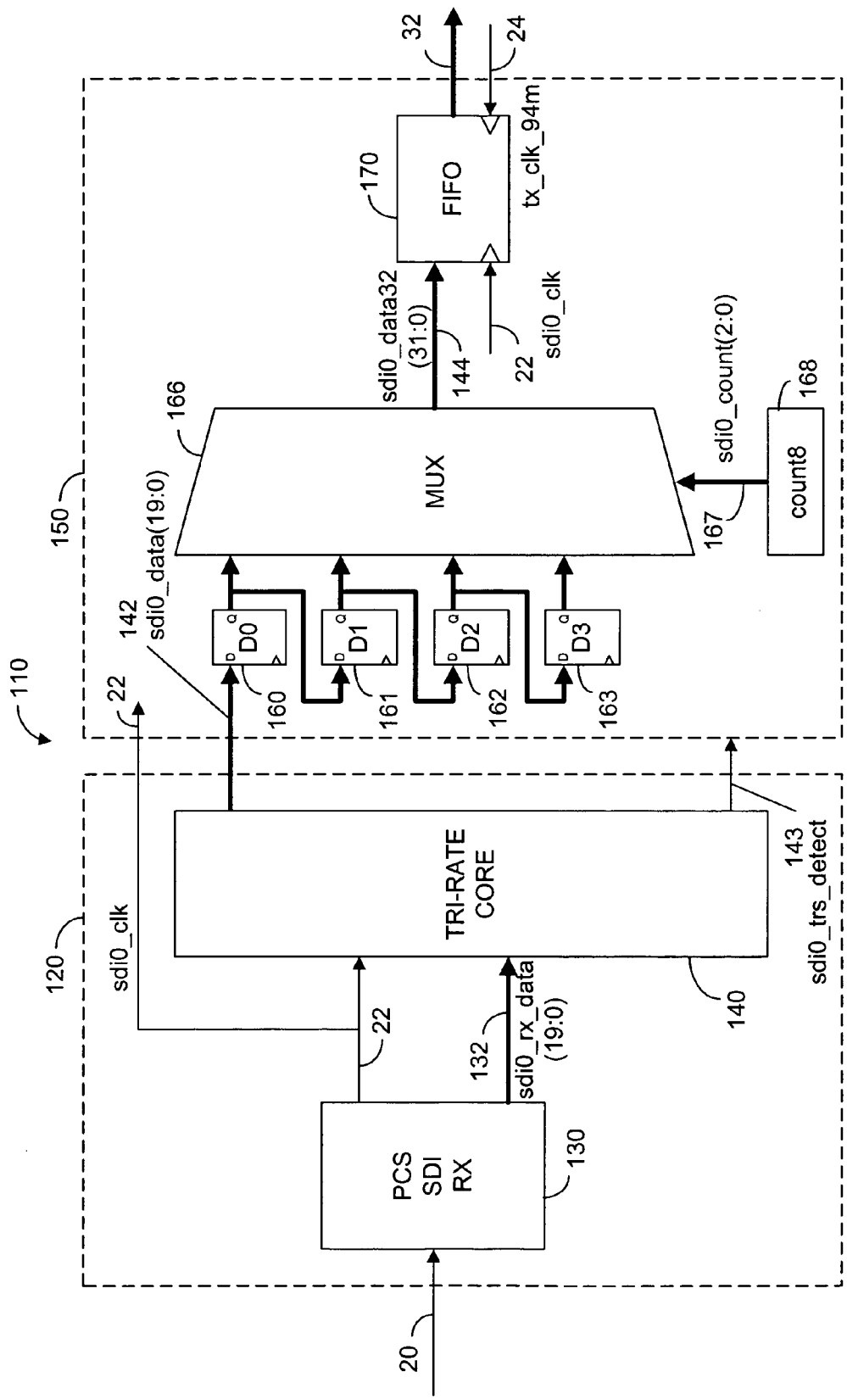
FIG. 4 is a detailed block diagram of a data processor in the transmitter as shown in FIG. 3.

FIG. 4 is a detailed block diagram of the data processor 110. The data processor 110 comprises a data converter portion 120 and a data buffer portion 150. Data converter portion 120 has a serial-to-parallel converter 130 for converting the serial input SDI0 data received in data link 20 into parallel data 132. Converter 130 also extracts the SDI0 clock signal 22 from the serial data stream. In one embodiment of the present invention, the parallel data 132 is provided in a 20-bit data stream to a core processor 140 where the parallel data 132 is decoded and analyzed. The SDI0 data rate information from clock signal 22 is used by data buffer portion 150 to determine how the decoded data 142 is packetized for transmission. Core processor 140 is configured to receive parallel data of multiple interface standards over the same physical cable: SD-SDI, HD-SDI and 3G-SDI interfaces. It is configured for automatic receive rate detection and dynamic transmit rate selection. Core processor 140 provides multiple SD source formats support: SMPTE 125M and SMPTE 267M; multiple HD source formats support: SMPTE 160M, SMPTE 274M, SMPTE 295M and SMPTE 296M; and 3G source formats support, including 3G Level-B format: SMPTE 425M. In addition, core processor 140 is configured to provide word alignment and time reference sequence (TRS) detection, and Video Payload Identifier (VPID) insertion/extraction for HD/3G. VPID information is used to determine dual link data status and alignment. As shown in FIG. 4, a TRS detect signal 143 is provided to the data buffer portion 150 by core processor 140.

Figure 5:
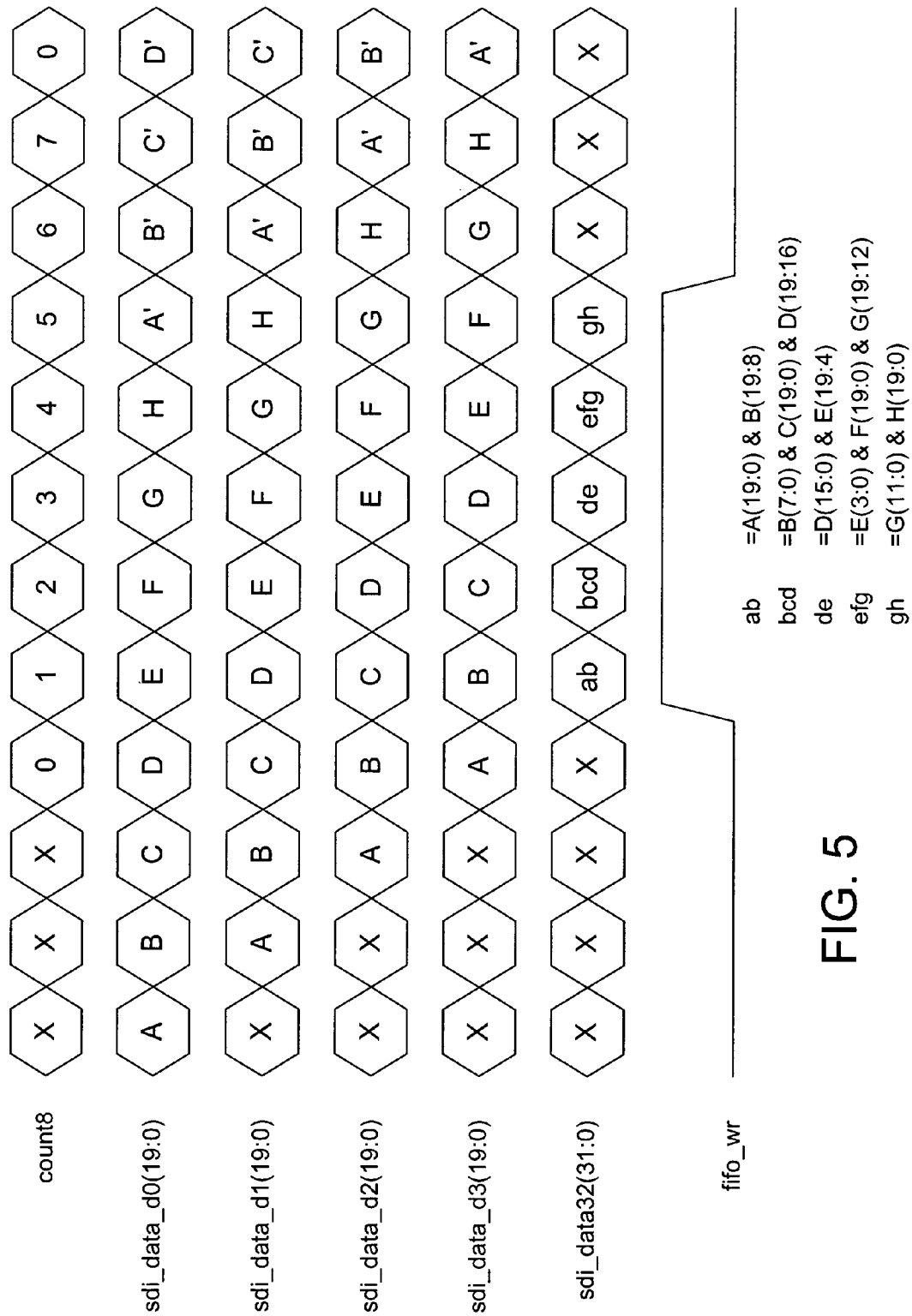
FIG. 5 is a timing chart showing an example of how parallel data is converted for data buffering.

Data buffer portion 150 uses a multiplexer 166 and a plurality of flip-flop circuits 160-163 to convert the 20-bit SDI0 data 142 into a 32-bit SDI0 data stream 144, which is provided to a FIFO 170. A counter 168 generates a signal 167 for shifting the SDI0 data latched in the flip-flop circuits 160-163, as shown in FIG. 5. In the timing chart as shown in FIG. 5, count8 indicates the count from the counter 168 and the count is used as a SELECT input to the multiplexer 166 and also used for generating the data write signal fifo_wr. sdi_data_d0 to sdi_data_d3 denote the parallel data provided by the flip-flop circuits 160-163 to multiplexer 166. The data write signal fifo_wr is used to present the 32_bit SDI0 data 144 (sdi_data32) to FIFO 170 (see FIG. 4). FIFO 170, herein referred to as channel-0 FIFO, is used to release the SDI0 data 144 as segmented data 32 to control module 180 when a channel-0 time slot for fiber optic packet transmission is available, based on the 93.75 MHz clock signal 24 and the SDI0 clock signal 22.

The data processor 110' (see FIG. 3) may be identical to the data processor 110. Data processor 110' has a data converter portion configured to convert the serial input SDI1 data received in data link 21 into parallel data and extracts the SDI1 clock signal 23 from the received data stream. The buffer portion in data processor 110' also uses a multiplexer and a plurality of flip-flop circuits to convert the 20-bit SDI1 data into a 32-bit SDI1 data stream and presents the 32-bit SDI1 data stream to a channel-1 FIFO, which releases the SDI1 data as segmented data 33 to control module 180 when a channel-1 time slot for fiber optic packet transmission is available, based on the 93.75 MHz clock signal 24 and the SDI1 clock signal 23. The block diagram for data processor 110' is typically the same as that discussed above with respect to data processor 110.

Once a fiber optic channel time slot for packet transmission is available, control module 180 reads either the segmented data 32 from the channel-0 FIFO or the segmented data 33 from the channel-1 FIFO and attaches a header section to indicate the data format and channel of the segmented data. At least one data segment, including one data packet and a header section, is then sent. Control module 180 is also configured to decide whether to send idles and RS422 information. Idles are used by the receiver 400 to align the incoming data decoder. Idles can indicate no data available or that an RS422 section is being provided.

FIG. 6 is a flowchart showing how control module 180 inserts the data packets and other sections in the extended video bitstream. At start, control module 180 sends out an idle at Step 810. If a new fiber-optic channel time slot for packet transmission is available, it is time to get a new data packet at Step 812. It is necessary to determine at Step 820 whether it is time to send an SDI0 data packet or an SDI1 data packet. If it is time to send an SDI0 data packet, it is determined at Step 822 whether SDI0 data is ready. If SDI0 data is not ready, the process loops back to Step 810. If the SDI0 data is ready, then an SDI0 header is sent at Step 830 and SDI0 data is sent at Step 832 and Step 836 until a packet is completed as determined at Step 834. At this point, one or more idles will be sent again at Step 810. It is determine at Step 820 to send an SDI1 data packet instead of an SDI0 data packet, it is further determined at Step 824 whether SDI1 data is ready. If SDI1 data is not ready, the process loops back to Step 810. If the SDI1 data is ready, then an SDI1 header is sent at Step 840 and SDI1 data is sent at Step 842 and Step 846 until a packet is completed as determined at Step 844. At this point, one or more idles will be sent again at Step 810.

In FIG. 3, it is shown that transmitter 100 has two transmission modules 191, 192 for transmitting two extended video bitstreams at 3.75 Gb/s rate over two optical fibers 14, 15 via fiber optical modules 194, 195. These two bitstreams are redundant. On the receiving side, only one bitstream is needed. Thus, receiver 400 needs only one fiber optical module to receive one of the two extended video bitstreams transferred over optical fibers 14, 15. Since the data in the received bitstream is in a serial form, there is no way of determining the bit position of a multi-bit word without some form of special information, for example. According to the present invention, idles are special words which may be identified by scanning groups of 10 bits in the incoming bitstream. Once idles are found, the data is considered aligned and data decoding may begin. From the header information, it is determined whether the SDI data is single-link or dual-link data. If it is single link, then the SDI data is output as is. If the data is dual link, the SDI data packets are separated and conveyed to two different channels (channel-0 or channel-1) based on the header information.

Figure 7:
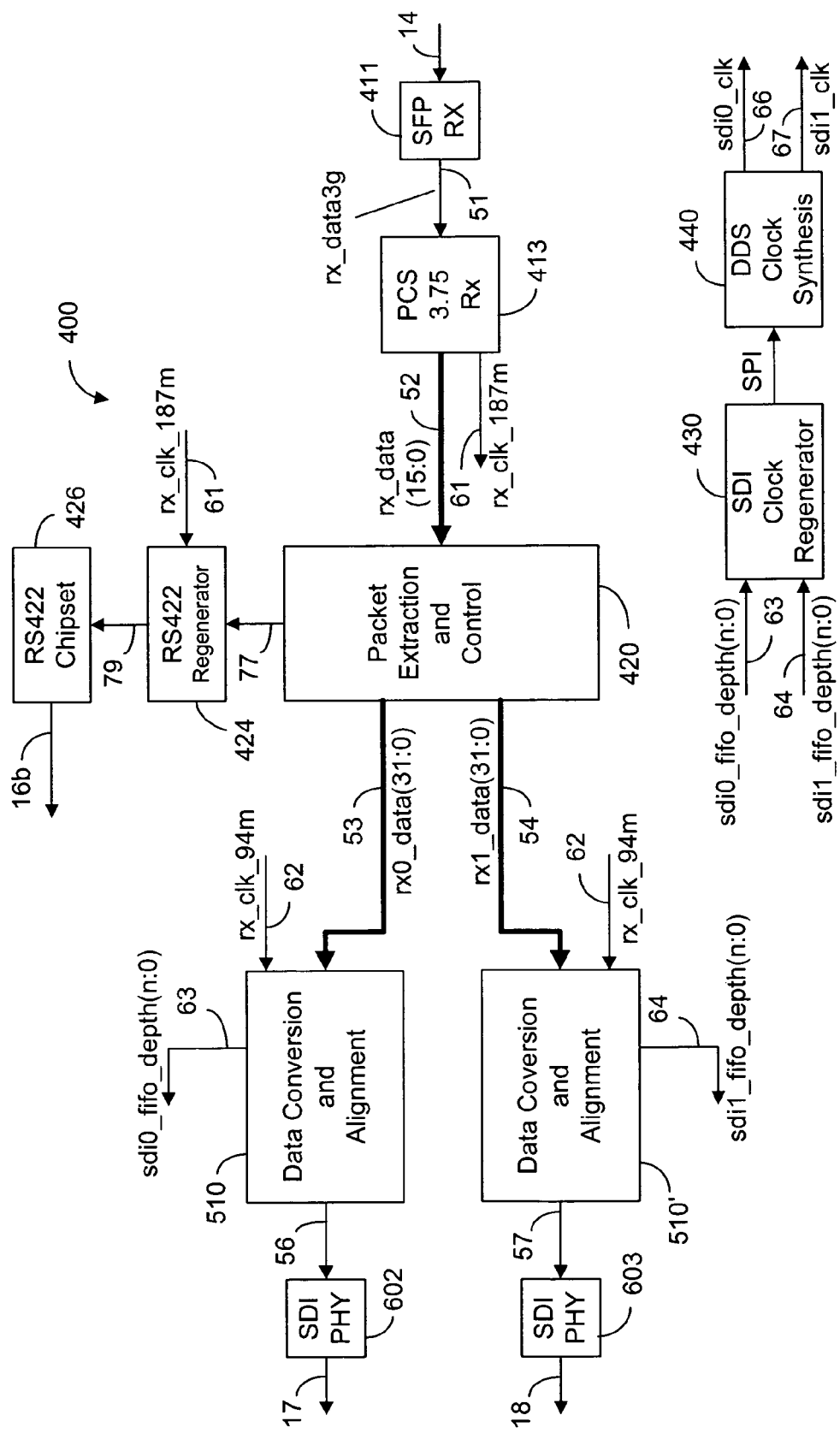
FIG. 7 is a block diagram of a receiver, according to one embodiment of the present invention.

FIG. 7 is a block diagram of the receiver 400 in the video extension system 10. Receiver 400 has one fiber optical module 411 to receive the extended video bitstreams transferred over optical fiber 14, for example. The 8b/10b encoded data 51 in the received serial data bitstream in 3.75 Gb/s rate is conveyed to a receiver module 413, where a 20× divider is used to generate a 187.5 MHz clock signal 61. By dividing the clock signal 61, a 93.75 MHz clock signal 62 is also obtained. Receiver module 413 decodes and converts the incoming serial data into parallel data 52 and provides the decoded data to a control module 420. In the case of the received data being dual-link data, control module 420 extracts SDI data packets from parallel data 52. The channel-0 data packets 53 are sent to data processor 510, which converts parallel data into serial SDI0 data 56 in a copper SDI format and outputs the serial data to data link 17 via connector 602. The channel-1 data packets 54 are sent to data processor 510', which converts parallel data into serial SDI1 data 57 in the copper SDI format and outputs the serial data to data link 18 via connector 603. Control module 420 also extracts RS422 information from the decoded data 52 and sends the information via link 77 to an RS422 regenerator 424 and an RS422 chipset 426 via data link 79. The RS422 data is provided on data link 16b to a camera, allowing the user to control the camera, for example.

In order to provide a clock signal to output the SDI0 data and the SDI1 data, receiver 400 uses a clock generating chip whose frequency can be adjusted. The clock generating chip has an SDI clock regenerating portion 430 and a DDS (direct-digital synthesizer) clock synthesis portion 440 and an SPI (serial peripheral interface) link. As shown in FIG. 7, the sdi0_clk signal 66 for sending out the SDI0 data and the sdi1_clk signal 67 for sending out the SDI1 data are regenerated based on buffer depth information indicative by signals 63, 64 provided by the data processors 510, 510' (see also FIG. 8).

Figure 8:
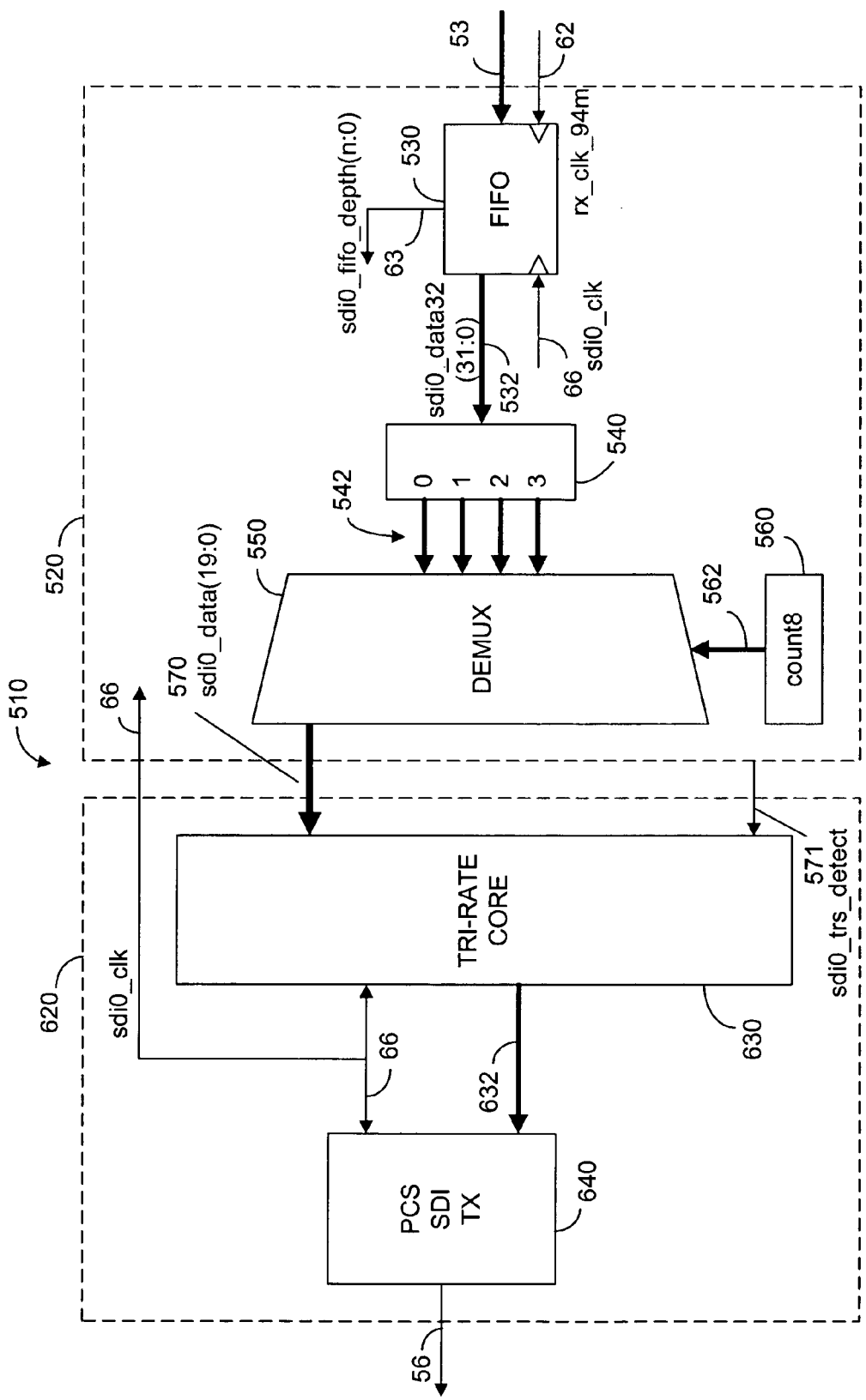
FIG. 8 is a detailed block diagram of a data processor in the receiver as shown in FIG. 7.
Figure 9:
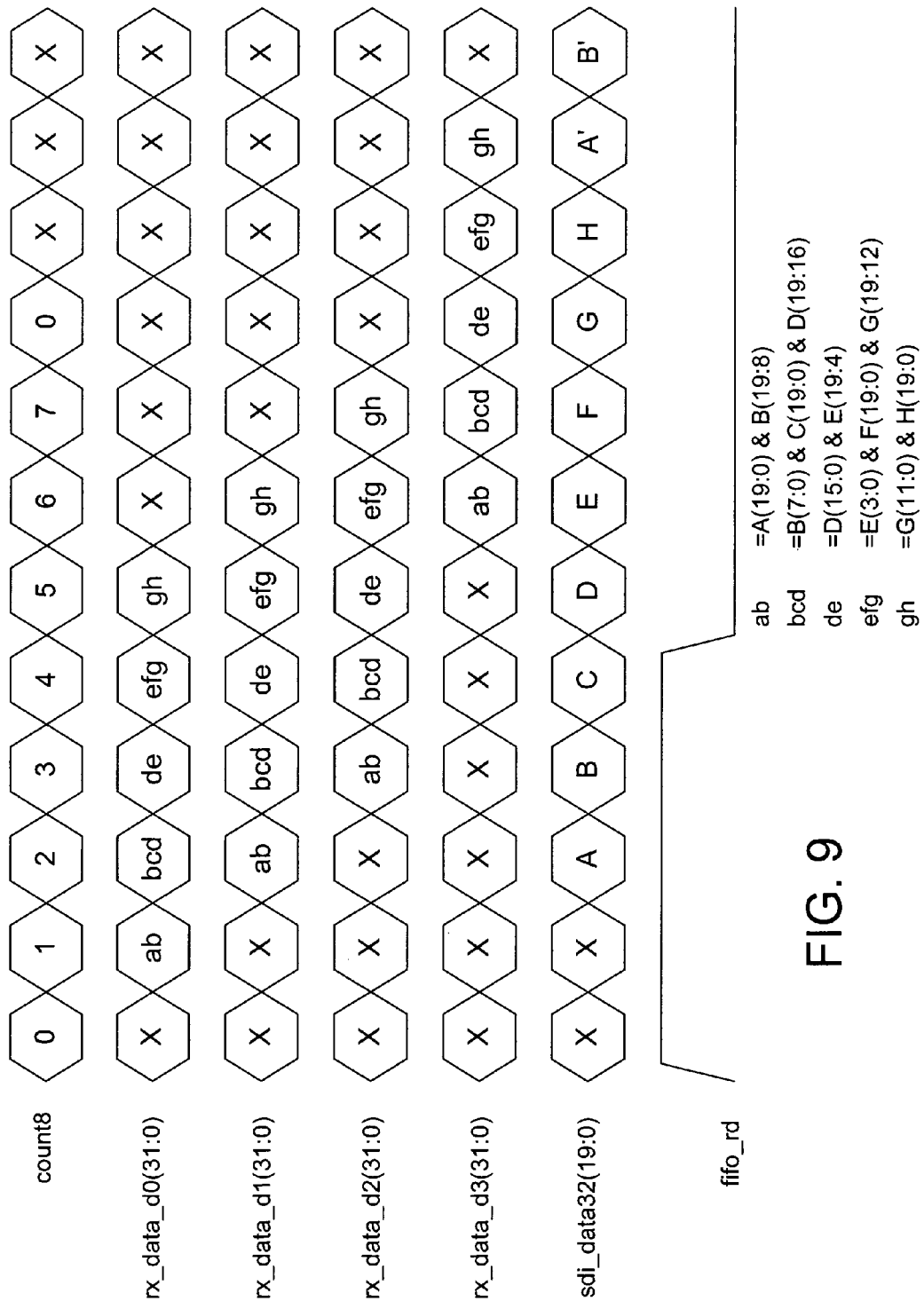
FIG. 9 is a timing chart showing an example of how parallel data is converted for demultiplexing.

FIG. 8 is a detailed block diagram of the data processor 510. Data processor 510 comprises a data buffer portion 520 and a data converter portion 620. The data buffer portion 520 has a FIFO 530 to receive the channel-0 data packets 53. Once the number of words in FIFO 530 reaches a prescribed level, the cumulated data is sent to a circuit 540, which conveys the delayed and shifted data 542 in four stages to the demultiplexer 550. From the 32-bit delayed and shifted data 542, demultiplexer 550 outputs SDI0 data 570 in 20-bits. The timing between the 32-bit data 542 and the 20-bit data 570 is shown in FIG. 9. The read signal fifo_rd in FIG. 9 is generated based on a signal 562 provided by a counter 560. FIFO 530 also outputs a signal 63 indicative of buffer depth information for regenerating the clock signal 66 in DDS clock synthesis portion 440 (FIG. 7).

Data converter portion 620 comprises a core processor 630 and parallel-to-serial data converter 640. Core processor 630 encodes the SDI0 data 570 to SDI standard and formats the encoded SDI0 data for SD-SDI, HD-SDI or 3G-SDI transport. The formatted data 632 is then sent to the converter 640 where data 632 is serialized onto 56 at the correct SDI data rate. Core processor 630 receives timing reference information 571 extracted from the SDI data for regenerating the original SDI0 data stream. When SDI0 and SDI1 data comprise a dual-link, a processor (not shown) intercepts the data 570 from SDI0 and SDI1 and aligns them using two buffers (one per each stream) based on their respective embedded timing signals, then passes the aligned data into core processor 571.

In the timing chart as shown in FIG. 9, count8 indicates the count from the counter 560 and the count is used as a SELECT input to the multiplexer 550 and also used for generating the data read signal fifo_rd. rx_data_d0 to rx_data_d3 denote the delayed and shifted data 542 presented in four stages to the demultiplexer 550 (see FIG. 8).

Referring to FIGS. 1-9, the transmitter 100 and the receiver 400, according to various embodiments of the present invention, can be made into separate modules. The transmitter 100 can have one input data link configured to receive one SDI video data stream at a 3G rate of 2.97 Gb/s and one or two output data links for transmitting an extended video bitstream over one or two optical fibers at 3.75 Gb/s. The transmitter can have an optional loop-out to provide the received video data stream. The transmitter 100 can have two input data links configured to receive two HD-SDI video streams at 1.485 Gb/s, two SD-SDI video streams at 270 Mb/s, or one HD-SDI at 1.485 Gb/s and one SD-SDI at 270 Mb/s. Transmitter 100 has one or two output data links for transmitting an extended video bitstream over one or two optical fibers at 3.75 Gb/s. When two video streams at SD or HD rate are received in the transmitter from two channels, both channels are multiplexed into an extended video bitstream as Channel-0, Channel-1, Channel-0, Channel-1, . . . and each of the data packets for Channel-0 and the data packets for Channel-1 is associated with an information segment comprising an idle and a header packet. One or more RS422 information packets can also be inserted for idles. Each of the idle, header packet and RS422 packet can be 32-bit long and the data packet can have 32,480 bits, for example. Idles are used by the receiver 400 to align the incoming data decoder. Idles can indicate no data available.

The receiver 400 can have one or two input data links for receiving one extended video bitstream at 3.75 Gb/s and one output data link for providing one SDI video data stream at 2.97 Gb/s. The receiver 400 can have two output data links for providing two video data streams at an SD or HD rate. The extended video bitstream may be embedded with audio and other data. The fiber based extension system is configured such that the extended video bitstream is immune to video pathological signals over the entire length of the fiber interconnect, while supporting all pathological patterns at all rates. It can be used for a wide variety of applications. For example, it can be used for Pro A/V, broadcast and corporate studio applications, including video production and editing, sports tele-production, field production, cross-town fiber links, cross on-campus production, pre-fibered venues, and courtesy feeds. RS422 information can be used for device control, such as remote camera control operations requiring pan, tilt and zoom functions.

When the receiver 400 receives an extended video bitstream containing dual link data, the dual link data is buffered until the line number embedded in each of the SI0, SDI1 data streams is equal and the timing reference sequences of each channel are aligned. That is, the video frame line number of Channel-0 equals the video frame line number of Channel-1. As the data packets for Channel-0 and data packets for Channel-1 are multiplexed and put onto one fiber optic cable, the delay in each channel will be the same regardless of distance traveled. Thus, according to one embodiment of the present invention, the video bitstream comprises an aligned, dual-link bitstream formed from the first video stream and the second video stream, and the first and second data packets comprise embedded timing reference information. When a receiver receives the extended video bitstream and retrieves the first and second data packets from the extended video bitstream, the receiver uses the timing reference information for data alignment in reconstructing the dual-link bitstream from the first data packets and the second data packets.

The receiver 400 uses a clock generating chip to generate a clock signal to output the SDI0 and SDI1 data. The use of a clock generating chip has multiple benefits. First, the clock does not have to be encoded and sent over the fiber optic channel thereby reducing bandwidth consumption. Second, the clock can be adjusted up or down in order to keep the FIFO level reasonable constant. Third, by adjusting the clock, data can be sent out at a very stable rate thereby improving the clock jitter.

Figure 10A:
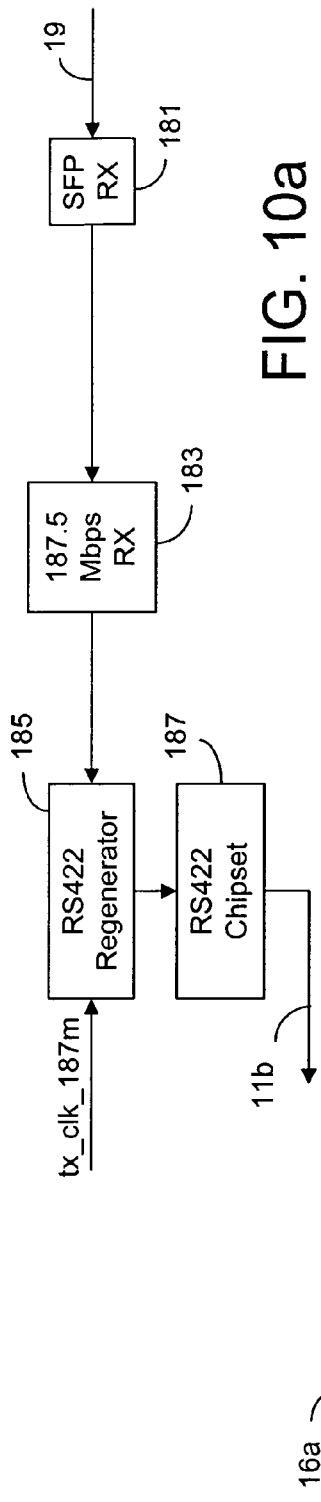
FIG. 10a is a block diagram showing the back-channel RS422 data transport in the transmitter, according to one embodiment of the present invention.
Figure 10B:
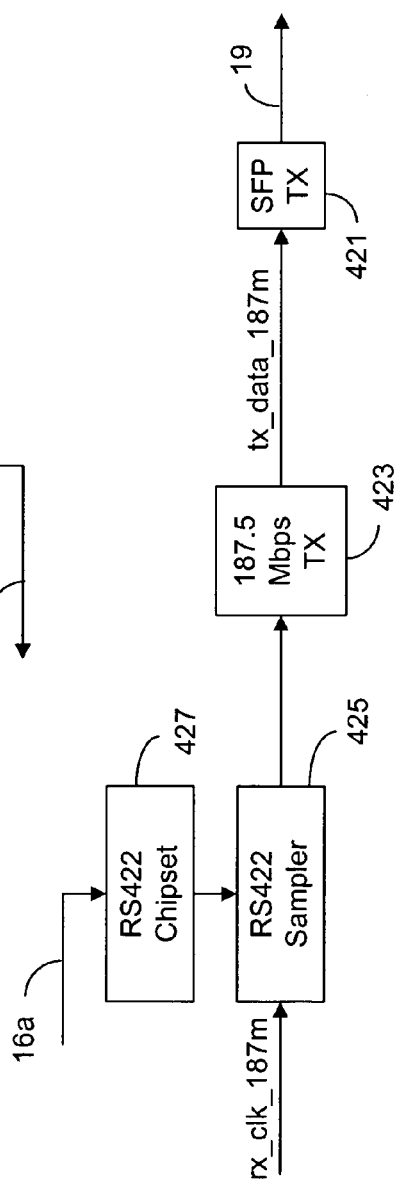
FIG. 10b is a block diagram showing the back-channel RS422 data transport in the receiver, according to one embodiment of the present invention.
Figure 10C:
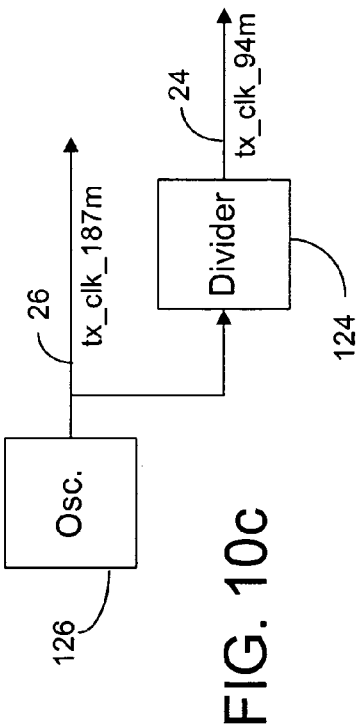
FIG. 10c is a block diagram showing a clock signal generator.

Transmitter 100 and receiver 400 use standard SFPs, some of which come with bidirectional data paths. One path can be used for video data transport, the other can be used for RS422 data going back from the receiver 400 to the transmitter 100—or back-channel RS422 data. The data transport for the back-channel RS422 data is substantially the same as the forward path video. The RS422 data is read at specific time intervals and is buffered in a FIFO. When enough RS422 data resides in the FIFO, the back-channel data generator begins to read the FIFO and pass it through an 8b/10b encoder where it can be sent to the transmitter 100 for alignment, buffering in a FIFO, and ultimately regeneration at the transmitter 100. The realization of back-channel data transport is shown in FIG. 10a and FIG. 10b. The block diagram in FIG. 10a is part of the transmitter 100 as shown in FIG. 3. As shown in FIG. 10a, RS422 information from receiver 400 is received via an SFP fiber optical module 181 and translated into an appropriate data rate by receiver module 183. Through a regenerator 185 and a chipset 187, RS422 information is provided to a user equipment (User Equip 1) via data link 11b (see FIG. 1). The block diagram in FIG. 10b is part of the receiver 400 as shown in FIG. 7. As shown in FIG. 10b, RS422 information from a control module (User Equip 2, see FIG. 1) and data link 16b is provided to a chipset 427 and a sampler 425. After being translated into an appropriate data rate by transmitter module 423, RS422 information is sent to the back channel data link 19 via an SFP fiber optical module 421. An RS422 chipset provides level translation from the physical world to the LVCMOS world of the PCB/FPGA. The chipset 187 (FIG. 10a) and the chipset 186 (FIG. 3) can be physically one and same chip. The chipset 427 (FIG. 10b) and the chipset 426 (FIG. 6) can be physically one and same chip. FIG. 10c is a block diagram showing an oscillator 126 and a divider 124 being used to generate the 187.5 MHz clock signal 26 and the 93.75 MHz clock signal 24 in the transmitter 100.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for video data extension, comprising:
receiving a video bitstream at a data processor, the video bitstream comprising Serial Digital Interface (SDI) video data received at a first bit-rate;
wherein the video bitstream comprises a first video stream comprising first serial data and a second video stream comprising second serial data;
obtaining a first clock signal from the first video stream and obtaining a second clock signal from the second video stream, the first clock signal and the second clock signal indicative of the first bit rate;
generating a third clock signal;
converting the first serial data into first parallel data and converting the second serial data into second parallel data;
segmenting via the data processor the video bitstream into a plurality of segments by dividing the first parallel data into a plurality of first data packets based on the first clock signal and the third clock signal, and dividing the second parallel data into a plurality of second data packets based on the second clock signal and the third clock signal, wherein the maximum number of bits in any segment of said plurality of segments is n with n a positive integer greater than one, and wherein at least some of said plurality of segments comprise n-bit data segments;
appending via a control module an additional segment to each of said plurality of segments for providing an extended SDI video bitstream, wherein the additional segment comprises m-bit information, wherein m is a positive integer greater than one;
arranging the first data packets and second data packets in an alternate manner for forming said plurality of segments; and
transmitting via a transmitter module the extended SDI video bitstream at a second bit-rate, wherein the second bit-rate is equal to or greater than (n+m)/n times the first bit-rate, wherein the third clock signal is based on the second bit-rate.

2. The method according to claim 1, comprising:
buffering the first and second parallel data before segmenting the video bitstream into the plurality of segments.

3. The method according to claim 1, wherein the extended SDI video bitstream comprises parallel data, said method further comprising:
converting the parallel data into serial data, and
encoding the serial data before transmitting the extended SDI video bitstream.

4. The method according to claim 1, wherein the m-bit information comprises header information.

5. The method according to claim 1, wherein the m-bit information comprises a word specified for data alignment purposes.

6. The method according to claim 4, wherein the m-bit information further comprises video control information.

7. The method according to claim 1, wherein said converting comprises:
- a serial-to-parallel conversion for converting the first serial data to a 20-bit parallel data, and
- a parallel-to-parallel conversion for converting the 20-bit parallel data to a 32-bit parallel data in said first parallel data.

8. The method according to claim 7, further comprising:
- shifting the 20-bit parallel data for simultaneously providing the 20-bit parallel data in four delayed parallel data streams, and
- selecting the first parallel data from the delayed parallel data streams.

9. The method according to claim 1, wherein each of the first clock signal and the second clock signal comprises a clock rate substantially equal to half of the first bit rate.

10. The method according to claim 1, wherein the video bitstream comprises an aligned, dual-link bitstream formed from the first video stream and the second video stream, and the first and second data packets comprise timing reference information, and wherein a receiver is arranged to receive the extended video bitstream and to retrieve the first data packets and the second data packets from the extended video bitstream, the receiver configured to use the timing reference information for data alignment in reconstructing the dual-link bitstream from the first data packets and the second data packets.

11. An apparatus for video data extension, comprising:
- an input end configured to receive a video bitstream, the video bitstream comprising Serial Digital Interface (SDI) video data received at a first bit-rate, wherein the video bitstream comprises a first video stream comprising first serial data and a second video stream comprising second serial data;
- a first data link for obtaining a first clock signal from the first video stream and a second data link for obtaining a second clock signal from the second video stream, the first clock signal and the second clock signal indicative of the first bit rate;
- a clock for generating a third clock signal;
- a converter for converting the first serial data into first parallel data and converting the second serial data into second parallel data;
- a segmenter configured to segment the video bitstream into a plurality of segments by dividing the first parallel data into a plurality of first data packets based on the first clock signal and the third clock signal, and dividing the second parallel data into a plurality of second data packets based on the second clock signal and the third clock signal, wherein the maximum number of bits in any segment of said plurality of segments is n with n a positive integer greater than one, and wherein at least some of said plurality of segments comprise n-bit data segments;
- a control module configured to append an additional segment to each of said plurality of segments for providing an extended SDI video bitstream, wherein the additional segment comprises m-bit information, wherein m is a positive integer greater than one, and to arrange the first data packets and second data packets in an alternate manner for forming said plurality of segments; and
- a transmitter module configured to transmit the extended SDI video bitstream at a second bit-rate, wherein the second bit-rate is equal to or greater than (n+m)/n times the first bit-rate, wherein the third clock signal is based on the second bit-rate.

12. The apparatus according to claim 11, wherein the m-bit information comprises header information and a word specified for data alignment purposes.

13. The apparatus according to claim 11, further comprising:
- a buffer for buffering the first and second parallel data before the segmenter segments the video bitstream into said plurality of segments.

14. The apparatus according to claim 11, further comprising:
- a processor configured to decode the video data before the segmenter segments the video bitstream into the plurality of segments.

15. The apparatus according to claim 11, further comprising:
- a first converter configured to convert the first serial data into first parallel data and to obtain a first clock signal from the first video stream, the first clock signal indicative of the first bit-rate;
- a second converter configured to convert the second serial data into second parallel data and to obtain a second clock signal from the second video stream, the second clock signal indicative of the first bit-rate; and
- wherein the segmenter comprises:
- a first buffer configured to release the first parallel data for forming a plurality of first data packets based on the first clock signal and the third clock signal, and
- a second buffer configured to release the second parallel data for forming a plurality of second data packets based on the second clock signal and the third signal, wherein the control module further configured to arrange the first data packets and the second data packets in an alternate manner for forming said plurality of segments.

16. The apparatus according to claim 11, further comprising:
- a receiving end configured to receive the extended SDI video bitstream at the second bit-rate, wherein the extended SDI video bitstream comprising a plurality of SDI video data segments and wherein the maximum number of bits in any segment in said plurality of SDI video data segments is n, and each of said plurality of SDI video data segments is associated with an information segment comprising data alignment information, and wherein the information segment comprises m bits;
- a second control module configured to extract the SDI video data segments from the extended SDI video bitstream based on the data alignment information for forming a reduced SDI video bitstream from the extracted SDI video data segments; and
- a transmitter configured to transmit the reduced SDI video bitstream at the first bit-rate.

17. The apparatus according to claim 16, wherein the extended SDI video bitstream comprises a plurality of first data packets and a plurality of second data packets arranged in an alternate manner for forming said plurality of SDI video data segments, wherein the information segment comprises header information indicating whether each of the video data segments comprises a first data packet or a second data packet, and wherein the control module is further configured to separate the plurality of first data packets from said plurality of second data packets for forming the reduced SDI video bitstream.

18. The apparatus according to claim 17, wherein the extended SDI video bitstream comprises encoded serial data, said apparatus further comprising:
   a receiver configured to decode and convert the encoded serial data into parallel data before the second control module extracts the SDI video data segments; and
   a processor configured to form a first data stream comprising said plurality of first data packets and a second data stream comprising said plurality of second data packets.

19. The apparatus according to claim 18, wherein the processor is further configured to convert the parallel data in the first data stream and in the second data stream into serial data having a clock rate substantially equal to half the second bit rate for transmission.

* * * * *